United States Patent [19]
Marum

[11] Patent Number: 5,297,141
[45] Date of Patent: Mar. 22, 1994

[54] ETHERNET AUTOMATIC ADAPTER INTERFACE CARD

[75] Inventor: John R. Marum, Berkeley, Calif.

[73] Assignee: Farallon Computing, Inc., Emeryville, Calif.

[21] Appl. No.: 814,888

[22] Filed: Dec. 27, 1991

Related U.S. Application Data

[63] Continuation of Ser. No. 563,454, Aug. 7, 1990, abandoned.

[51] Int. Cl.$^5$ .................. H04L 12/40; H04B 10/20
[52] U.S. Cl. ........................... 370/85.13; 370/85.1; 340/517; 361/5; 307/86
[58] Field of Search ............ 370/112, 28, 85.1, 85.13; 340/825, 825.05, 825.12, 310 R, , 310 A, 310 CP, 538, 517; 455/343, 348, 349; 361/5, 45, 179, 392; 328/104, 105, 152, 153, 154; 307/80, 85, 86, 87

[56] References Cited

U.S. PATENT DOCUMENTS

| | | | |
|---|---|---|---|
| 4,623,884 | 11/1986 | Ihara et al. | 340/825.05 |
| 4,823,393 | 4/1989 | Hashimoto | 455/343 |
| 4,963,763 | 10/1990 | Minagawa et al. | 340/825.05 |

Primary Examiner—Benedict V. Safourek
Assistant Examiner—H. Kizou
Attorney, Agent, or Firm—Davis & Schroeder

[57] ABSTRACT

An Ethernet adapter card for automatically switching a workstation into a network is provided. The adapter card utilizes a current circuit to sense current drawn by an external communications network and a circuit for automatically switching between a card-mounted internal transceiver and the network's external transceiver whenever the external network is coupled to the workstation via an AUI port. The adapter card provides for default selection of the internal transceiver when the external communication network is disconnected from the workstation AUI port.

4 Claims, 7 Drawing Sheets

KEY TO FIG. 2

ETHERNET AUTOMATIC ADAPTER INTERFACE CARD

This is a continuation of prior copending application Ser. No. 563,454 filed Aug. 7, 1990 (now abandoned) and assigned to the assignee of the present application.

BACKGROUND OF THE INVENTION

The present invention relates generally to switching circuits and, more particularly, to a current sensing automatic switching network for switching between transceivers on computer networking systems.

It is common practice in the computer utilization art to interconnect computers and their peripheral devices into a local area network to allow the exchange of information between computers, share input and output devices and to access the network from remote points. The Ethernet system which interconnects two or more computers or workstations into a network is well established in the art and has become a standard network with well defined parameters, allowing devices from dissimilar manufacturers to be joined together. Communication over the network between each computer, input device or output device thereon, is performed by a component within each unit commonly referred to as a transceiver. The Ethernet is a narrow band network system that has no central control. Consequently, two or more transceivers may communicate over the network only sequentially. When a transceiver wishes to transmit over the network, it must first "listen" to determine that no other transceiver is transmitting. When any one transceiver is transmitting over the network all other transceivers on the network must wait their turn to avoid overlapping messages which result in unintelligible communications. This sequential operation is not problematic with simple networks but becomes a substantial limitation as the network increases in complexity. This problem is manifest as communication delays between devices.

The problem of communication delay has been addressed in several ways. Networks may be subdivided into smaller sub-networks which are then joined together into a large network with switching or filter devices such as bridges or gateways. Bridges connect two sub-networks so that only communication addressed to devices on the other network are passed over. This allows the communications traffic to be localized and filters out traffic unnecessary for either sub-network's activities. A gateway typically connects several Ethernets or other networks. The gateway receives and stores a message, looks up the destination address attached to the message in a table and then routes the message over the appropriate network to the proper node. These functions take time and as the communications traffic increases, the delays inherent in the system become significant.

One method to minimize the time delays in switching circuits is to limit the storage time while the circuit determines the proper destination. This is accomplished by reading only the address associated with the communication and routing the message immediately, thus achieving a routing decision while the first transceiver is still transmitting. This on-the-fly routing capability allows the message to be switched to the appropriate sub-network and received at the proper node while the sending transceiver is still transmitting. The circuitry for this fast logic switch is both complex and expensive, utilizing numerous expensive components.

The cost of conventional bridges, gateways and on-the-fly switches is difficult to reduce since their standard components are presently produced in large quantities at great cost and have not reflected the conventional economies of mass production. Creation of custom components using application specific integrated circuit technology is difficult to integrate with present technology and would not likely yield any significant cost reduction in switching circuitry.

There are numerous commercially available plug-in circuit boards or adapter cards which serve to interface various devices, such as desktop personal computers, to external networks. These adapter cards have been standardized in the art and are generally referred to as an Attachment Unit Interface (AUI port). These adapters all require some sort of switching device, either manual or automatic, to select either an internal transceiver connected to one external network or an external transceiver on an alternate external network. Typically, commercially available prior art Ethernet adaptor cards require a user to manually set a physical switch to select the external transceiver and alternate network when the cable for the alternate network is connected to or plugged into the device AUI port. If a manual switch should be inadvertently left in the incorrect position, both internal and external transceivers are accessed simultaneously, resulting in intermittent operation of both and subsequent data loss. Further, most prior art installations include card mounted components access to which is gained only by opening the computer or other device case thus greatly increasing the time required to connect an alternate network to the computer.

SUMMARY OF THE INVENTION

In use, the Ethernet automatic switching adaptor of the present invention provides a card-mounted internal transceiver for use with a communications network, e.g., a twisted pair telephone line. When a second, alternate communications network is connected to the workstation AUI port, the adapter card automatically selects the external transceiver on the alternate network without requiring the operator to reset manual switches. Since external transceivers draw some current from the workstation through the interface card, i.e., the AUI port, this common characteristic is exploited in the present invention.

In an adapter card constructed according to the principles of the present invention, a current sensing circuit comprised of inexpensive transistors and resistors detects the quiescent current drawn by an external transceiver in a communication network coupled to that workstation or other device and automatically interrupts power to the internal transceiver mounted on the adapter card. A multiplexer circuit then automatically decouples the internal transceiver in the workstation and connects the workstation to the alternate network and its external transceiver via the AUI port. When the alternate network and external transceiver is disconnected from the AUI port, the sensing circuit detects the termination of the external transceiver activity and restores power to the internal transceiver and the multiplexer reverts to a default condition assigned to the internal transceiver, thereby recoupling the internal transceiver without the requirement to reset any manual switches. The workstation then continues to function utilizing the internal transceiver until another alternate network is coupled to its AUI port. In a simplified circuit, when the power is interrupted to the internal transceiver mounted on the adapter card, the transmit, data receive and collision detect lines are tristated within the internal transceiver. Hence, the internal transceiver can remain capacitively coupled to the transmit, data receive and collision detect lines.

An adapter card which automatically selects a network when it is coupled to or plugged into the AUI port greatly reduces the installation time required, and the accompanying loss in work output, to manually reset switches. Further, the possibility of neglecting to reset the switches or of incorrectly resetting the switches is prevented.

DESCRIPTION OF THE DRAWING

A fuller understanding of the present invention will become apparent from the following detailed description taken in conjunction with the accompanying drawing which forms a part of the specification and in which.

DETAILED DESCRIPTION OF THE PREFERRED EMBODIMENT

Figure 1:
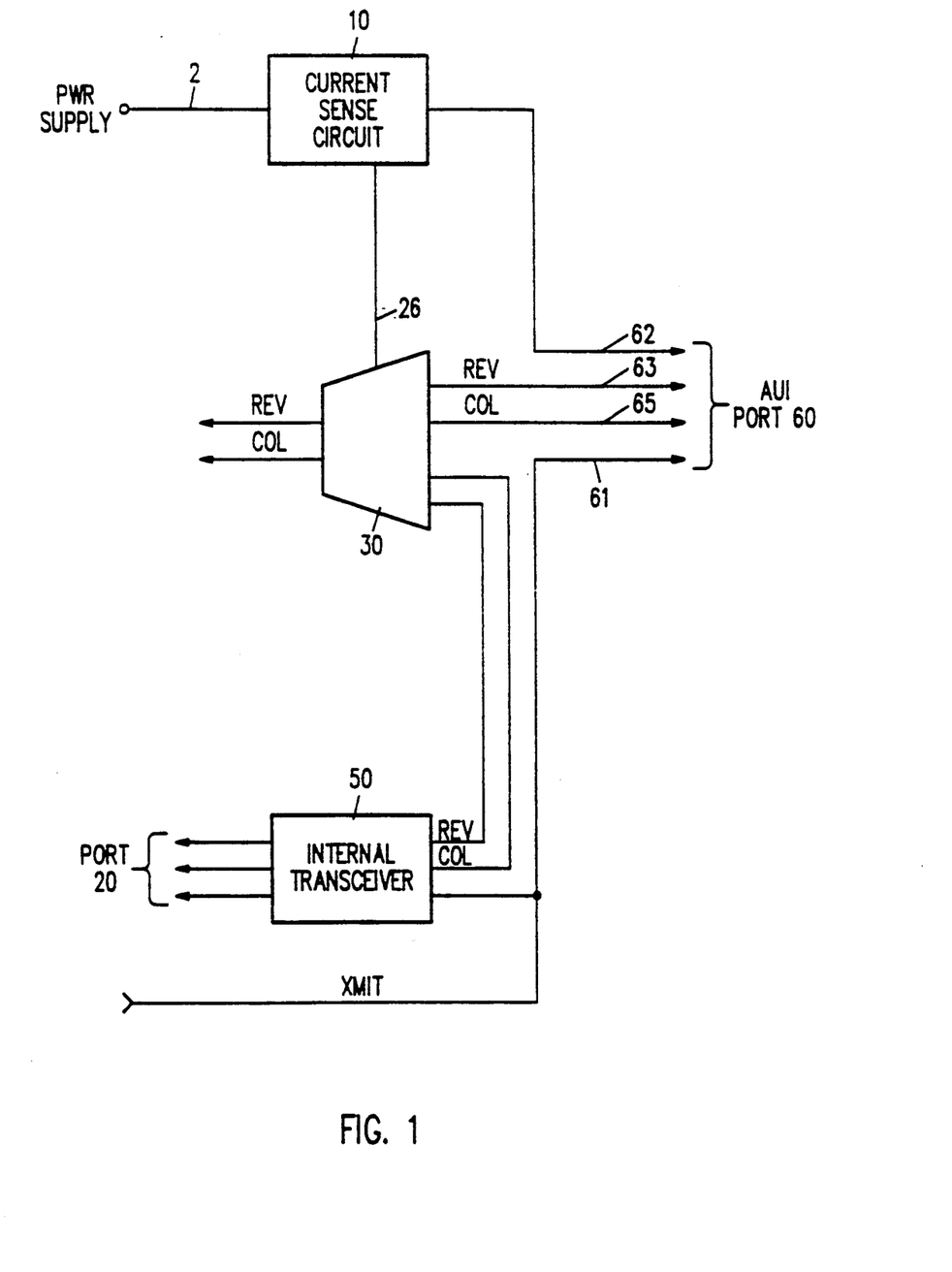
FIG. 1 is a functional block diagram of an automatic switching adapter card according to the principles of the present invention.
Figure 2A:
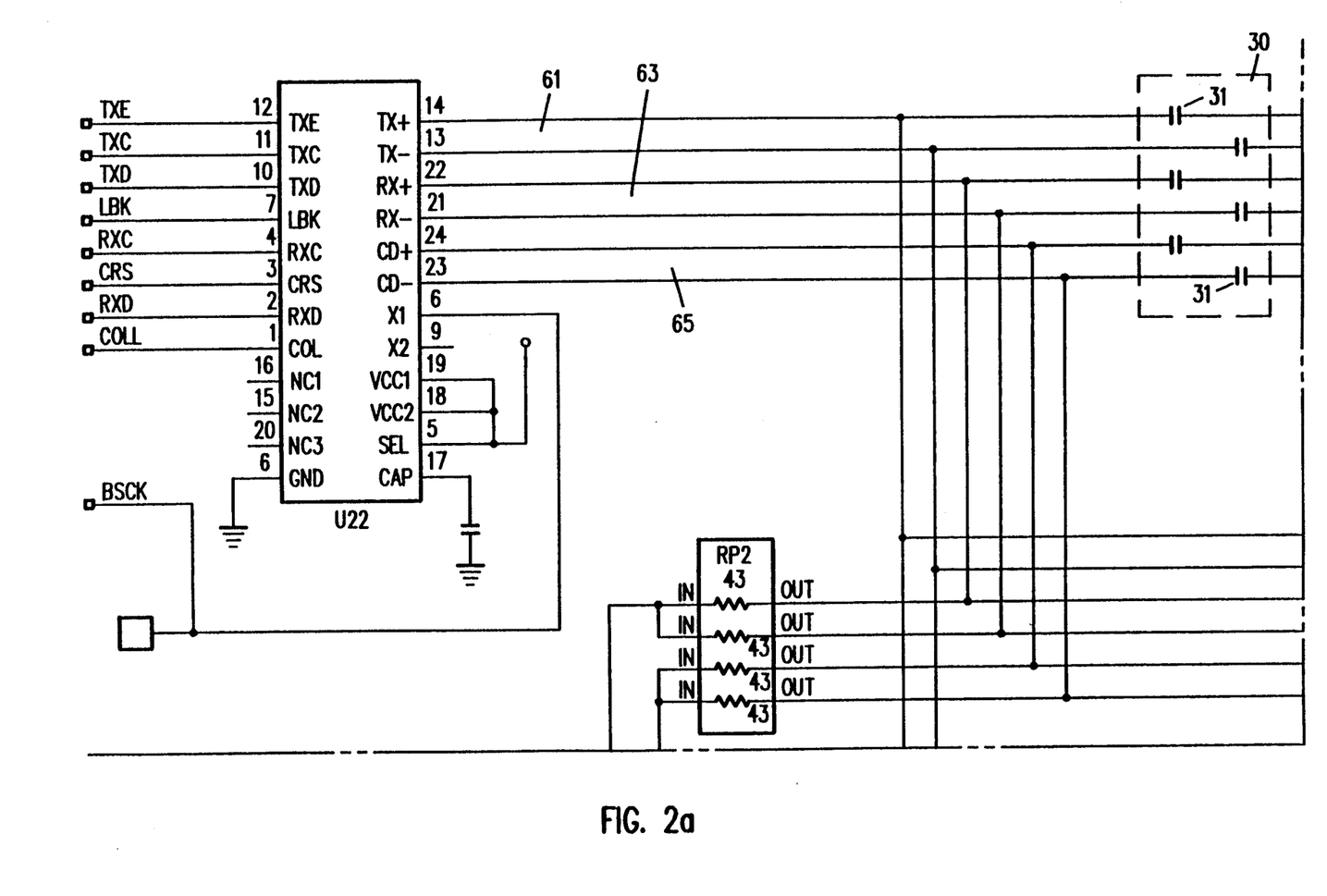
FIG. 2, which consists of FIGS. 2a-2a, is a schematic diagram of an embodiment of an automatic switching adapter card employing tristated signal lines in the internal transceiver along with capacitive coupling.
Figure 2B:
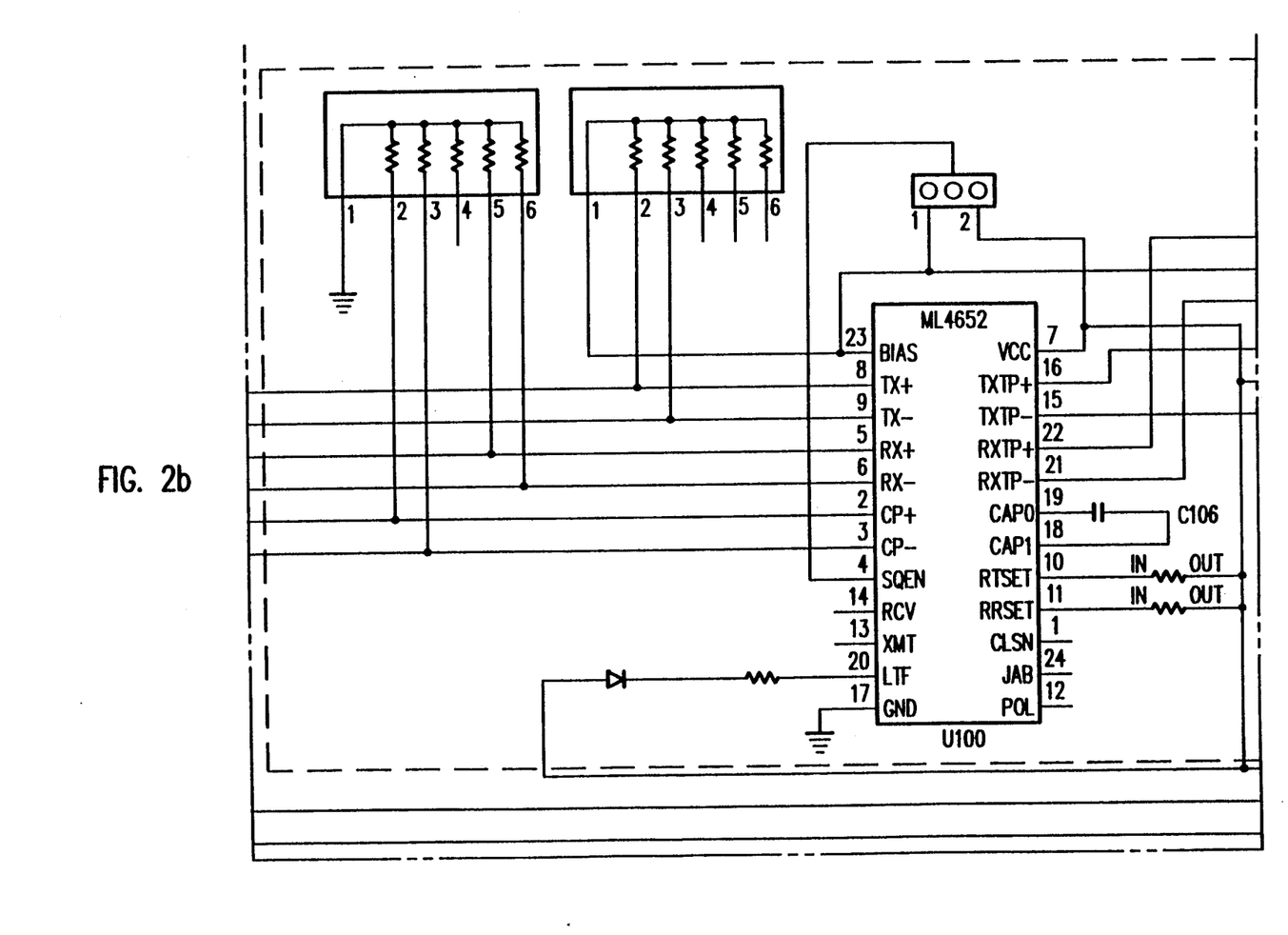
Figure 2C:
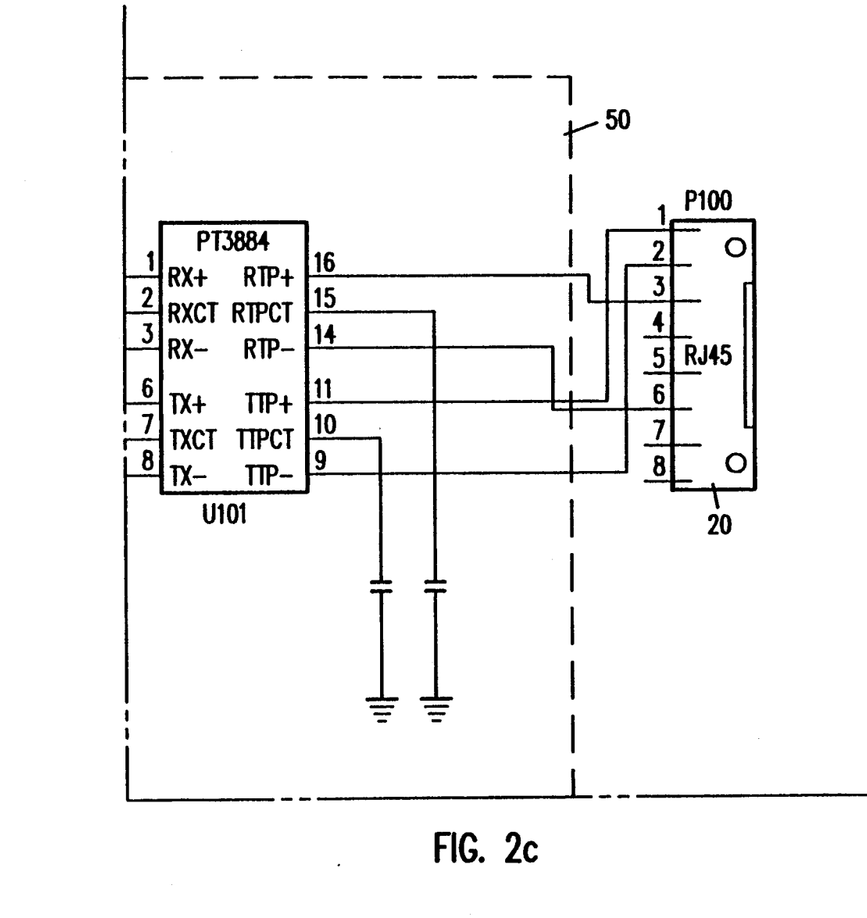
Figure 2D:
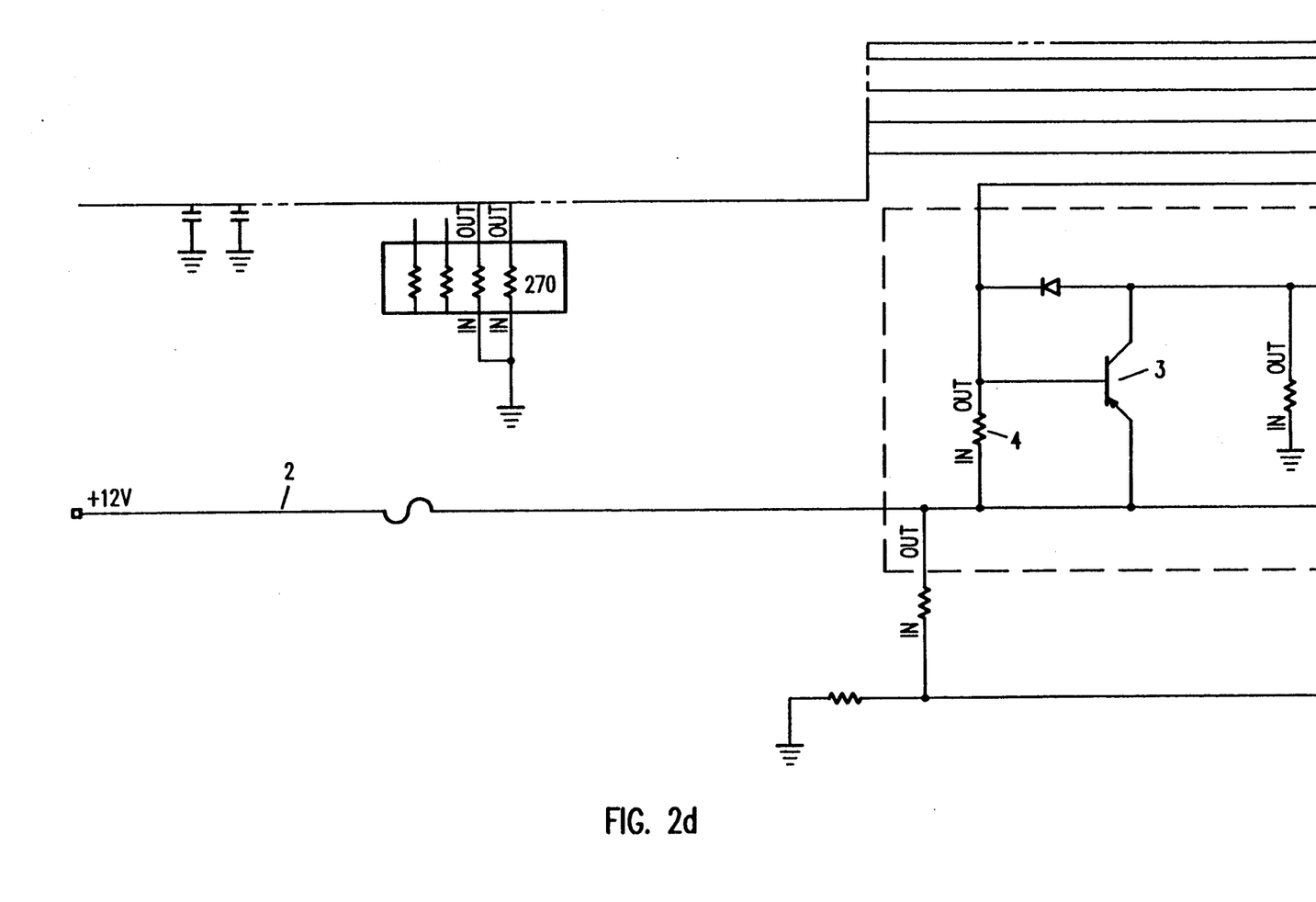
Figure 2E:
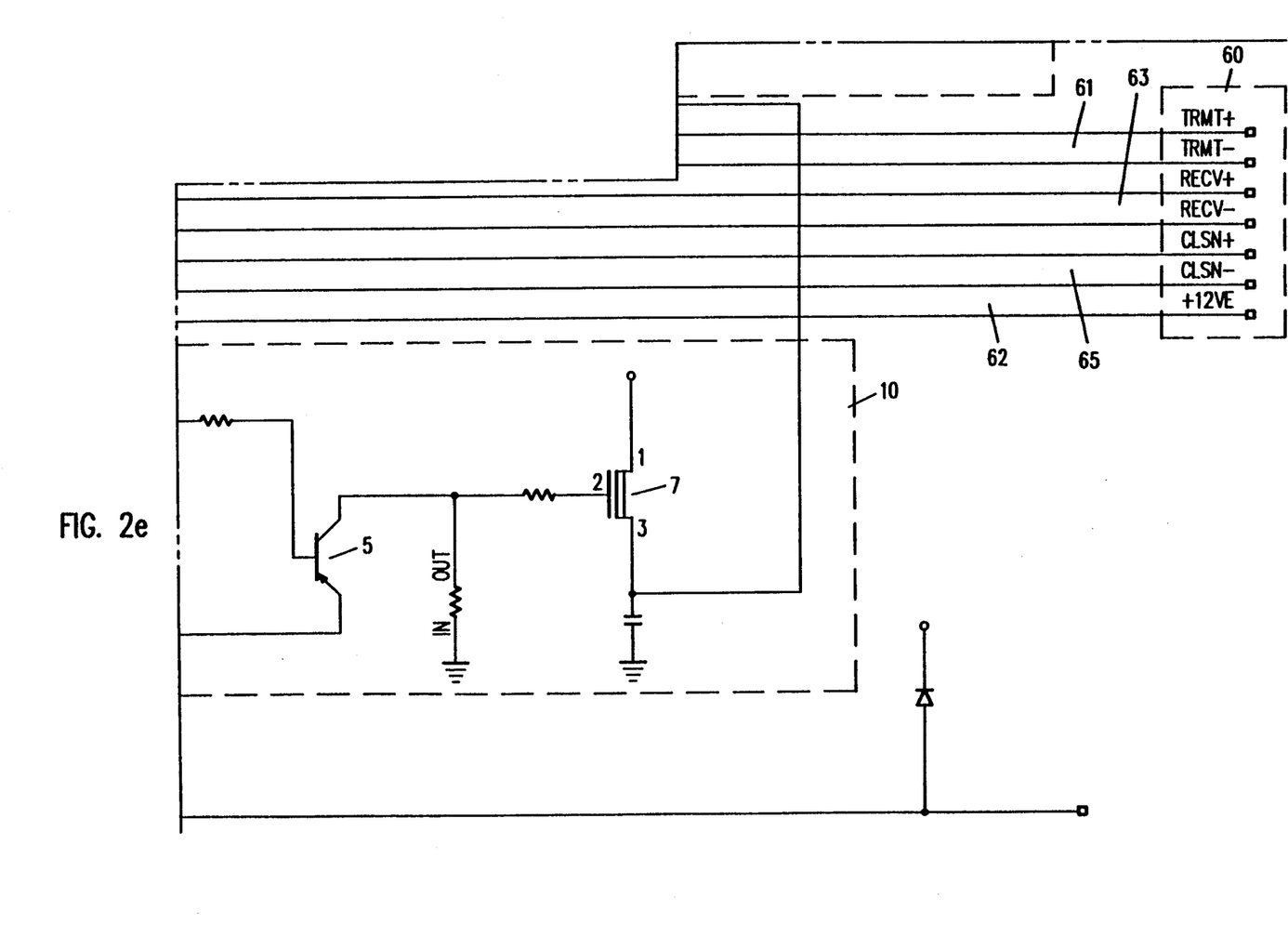

Referring now to FIG. 1, a function block diagram of an automatic switching adapter card according to the principles of the present invention is shown. The automatic switching circuit comprises a current sensing circuit 10 placed in series between a workstation or other device, such as a personal computer (not shown), power supply and an attachment circuit interface (AUI port) 60 which couples the workstation to an external transceiver (not shown) when an external communications network system, such as Ethernet, is connected to the AUI port 60. The adapter card of the present invention, also includes a multiplexer circuit 30 and an internally mounted transceiver 50 which is coupled to another external network via port 20 such as a twisted pair telephone line. Under normal operating conditions, the internal transceiver 50 will be coupled via the multiplexer 30 to the workstation and communications will be routed via the internal transceiver 50. Whenever a second, alternate communications network and its external transceiver are coupled to the workstation via AUI port 60, it is necessary to switch the workstation from the internal transceiver 50 to the external transceiver.

When the alternate network is coupled to the workstation via AUI 60 port, its external transceiver will draw its normal operating power from the workstation power supply via line 62 and AUI port 60. Current sense circuit 10 detects current on power line 62 going to AUI port 60. When current drawn by an external transceiver (not shown) coupled to AUI port 60 is detected by current sense circuit 10, current sense circuit 10 couples a signal to multiplexer 30 on line 26. In response, multiplexer 30 selects AUI port 60 thus coupling the external transceiver to the workstation. When the alternate network is disconnected from AUI port 60, current sense circuit 10 detects the absence of current on line 62 and drops the signal on line 26 to multiplexer 30, allowing multiplexer 30 to revert to a normal or default state which selects the internal transceiver 50 thereby reconnecting the internal transceiver to the workstation.

Referring now to FIG. 2, a schematic diagram of another embodiment of the automatic switching adapter card is shown. With no external network connected to AUI port 60, no current is drawn through the port and transistor 3 is biased off. When an external network is connected to AUI port 60, current from the power supply on line 2 passes through resistor 4 and then is routed to AUI port 60 on line 62. The voltage drop across resistor 4 turns on transistor 3 which then provides additional current to AUI port 60 to serve the external transceiver. Transistor 3 is of PNP type such as 2N6727. When transistor 3 turns on, it cuts off the base current to transistor 5 which turns off transistor 5. Transistor 5 is of PNP type such as 2N6727. When transistor 5 is turned off, it in turn turns off power transistor 7. Power transistor 7 is typically a field effect transistor (FET) of type 1RFZ12. Power FET 7 provides power to the internal transceiver 50 via line 11. Consequently, when power FET 7 is turned off, the power to the internal transceiver 50 is interrupted.

Figure 3:
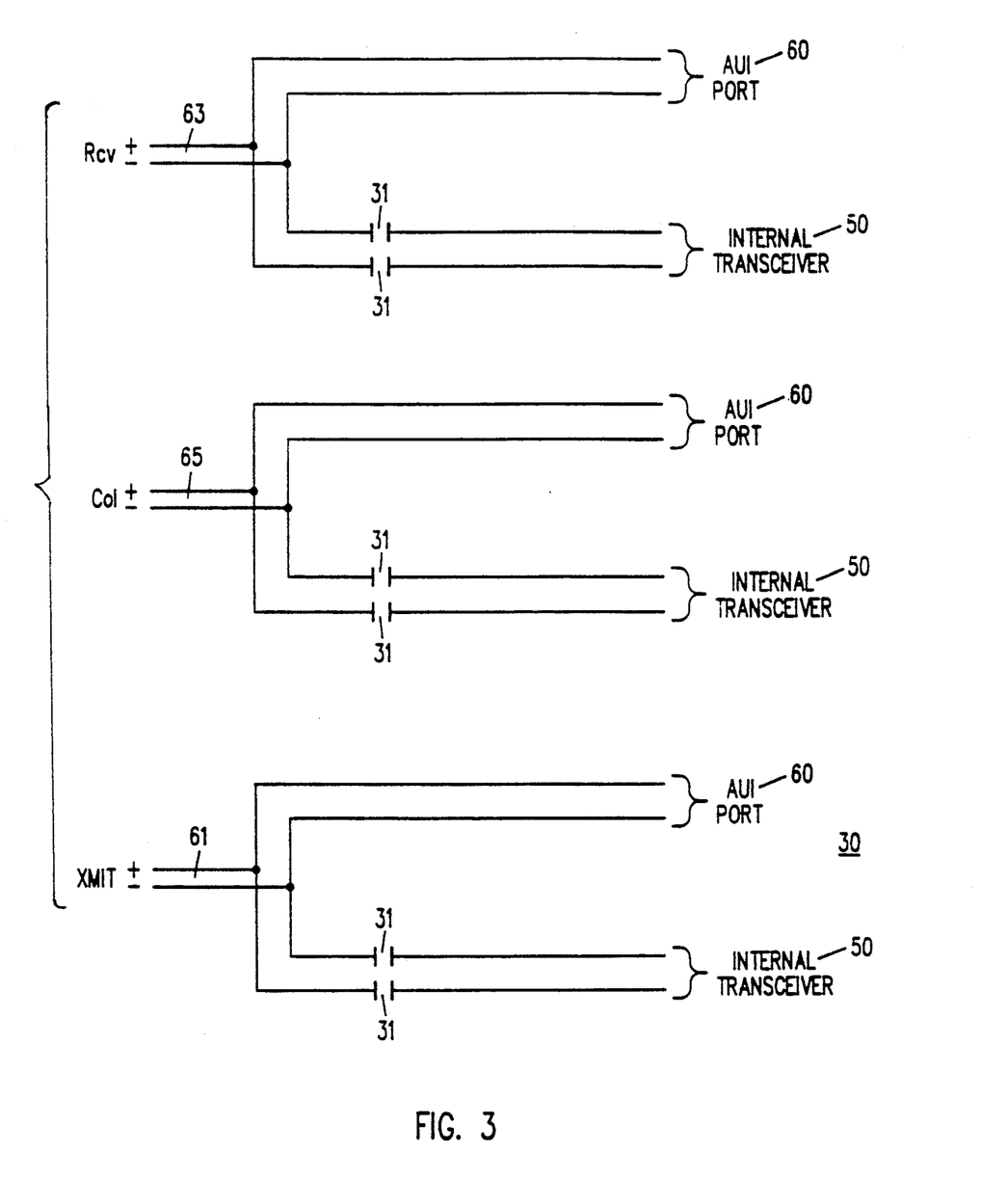
FIG. 3 is a schematic diagram illustrating the capacitive coupling of the circuit shown in FIG. 2.

The internal transceiver 50 utilizes tristate logic, i.e., its input and output stages can assume three states, thus both the internal and external transceivers can utilize time-shared lines for their common signals, the transmit 61, data receive 63 and collision detect 65 lines. This tristate characteristic of the internal transceiver 50 eliminates the multiplexer 30 and allows coupling of the internal transceiver 50 inputs and outputs to the time-shared lines via coupling capacitors 31. The coupling capacitors 31 are shown inside the dashed box 30 of FIG. 2. When the internal transceiver 50 is active, i.e., has power applied via line 11, its input and output stages can have either of two normal low-impedance states, 0 or 1, and its input and output signals are coupled to the time-shared lines 61, 63, 65 via coupling capacitors 31. When the internal transceiver is deselected, i.e., when power FET 7 has been turned off, its input and output stages assume a high-impedance state. Thus, there is no conflict in thus allowing the external transceiver to be coupled to the workstation via AUI Port 60 and the time-shared lines 61, 63, 65. FIG. 3 shows the specific coupling arrangements of the transmit 61, data receive lines 63 and collision detect lines 65 employing the capacitors 31 shown inside the dashed box 30 of FIG. 2.

The present invention has been described with reference to a preferred embodiment in terms applicable to an Ethernet local area network. However, it should be understood that the foregoing detailed description is only illustrative of the invention and those skilled in the art will recognize that changes in form and detail may be made to the present invention without departing from the spirit of the invention, or exceeding the scope of the appended claims.

I claim:

1. A current sensing automatic switching network comprising:
   an attachment unit interface port having a power supply line, first and second transmit lines, first and second data receive lines, and first and second collision detect lines;
   an internal transceiver having input and output signal terminals comprising first and second transmit terminals, first and second data receive terminals, and first and second collision detect terminals, said internal transceiver characterized in that it tristates said input and output signal terminals when it is powered down, said internal transceiver having a power terminal at which power may be applied;

a plurality of DC isolating means each individually coupling one of said transmit lines, data receive lines, and collision detect lines of said attachment unit interface port to a respective one of said transmit terminals, data receive terminals, and collision detect terminals of said internal transceiver; and a current sensing circuit coupled to said power supply line of said attachment unit interface port and coupled to said power terminal of said internal transceiver for powering down said internal transceiver when current is drawn through said power supply line of said attachment unit interface port.

2. A circuit comprising:

an attachment port at which an external transceiver may be connected, said attachment port having a power supply line and input and output signal lines;

an internal transceiver having input and output signal terminals, said internal transceiver being characterized in that it tristates said input and output signal terminals when it is powered down, said internal transceiver having a power terminal at which power may be applied;

a plurality of DC isolating means each individually coupling one of said input and output signal lines of said attachment port to a respective one of said input and output signal terminals of said internal transceiver; and a current sensing circuit coupled to said power supply line of said attachment port and coupled to said power terminal of said internal transceiver for powering down said internal transceiver when current is drawn through said power supply line of said attachment port.

3. The circuit of claim 2 in which said current sensing circuit further comprises:

a resistor connected from the power supply line of said attachment port to a power supply thereby resulting in a voltage appearing across said resistor when current is drawn through said power supply line of said attachment port;

a first transistor having its base connected to one end of said resistor and its emitter connected to the other end of said resistor, a diode connected from the collector to the base of said first transistor;

a second transistor having its base connected by a resistive network to the collector of said first transistor, the emitter of said first transistor being connected to the emitter of said second transistor; and a field effect transistor having its gate connected by a resistive network to the collector of said second transistor, said field effect transistor having its source connected by a capacitor to ground and by a conductor to said power terminal of said internal transceiver, said field effect transistor having its drain connected to a VCC power source.

4. The circuit of claim 2 in which said current sensing circuit further comprises:

a resistor in series with said power supply line of said attachment port;

a first transistor stage coupled across said resistor so as to be turned on when a voltage appears across said resistor;

a second transistor stage coupled to said first transistor stage so as to be turned off when said first transistor stage turns on; and a power FET stage connected to the power terminal of said internal transceiver for applying power thereto, said power FET stage being coupled to said second transistor stage so as to be turned off when said second transistor stage turns off, thereby interrupting power applied to said power terminal of said internal transceiver.

* * * * *